US010191891B2

(12) United States Patent
Sunderland et al.

(10) Patent No.: US 10,191,891 B2
(45) Date of Patent: Jan. 29, 2019

(54) INTERACTIVE PREVIEW TEASERS IN COMMUNICATIONS

(71) Applicant: MICROSOFT TECHNOLOGY LICENSING, LLC, Redmond, WA (US)

(72) Inventors: Mark Sunderland, Redmond, WA (US); Matthew Wood, Bellevue, WA (US); Aditi Desai, Redmond, WA (US); David De La Brena, Sammamish, WA (US); Amit Wadhwani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 14/836,691

(22) Filed: Aug. 26, 2015

(65) Prior Publication Data

US 2017/0060824 A1    Mar. 2, 2017

(51) Int. Cl.
*G06K 9/00* (2006.01)
*G06F 17/22* (2006.01)
*G06F 17/27* (2006.01)
*G06Q 10/10* (2012.01)

(52) U.S. Cl.
CPC ...... *G06F 17/2235* (2013.01); *G06F 17/2705* (2013.01); *G06K 9/00302* (2013.01); *G06K 9/00442* (2013.01); *G06Q 10/107* (2013.01)

(58) Field of Classification Search
CPC ............ G06F 17/2235; G06F 17/2705; G06K 9/00302; G06K 9/00442
See application file for complete search history.

(56) References Cited

U.S. PATENT DOCUMENTS

| 8,032,597 | B2  | 10/2011 | Khoo |
| 8,185,591 | B1* | 5/2012  | Lewis ................. G06Q 10/107 |
|           |     |         | 358/1.15 |
| 8,577,338 | B2  | 11/2013 | Neelakantan et al. |
| 8,775,520 | B1  | 7/2014  | Lewis et al. |

(Continued)

FOREIGN PATENT DOCUMENTS

| WO | WO 2013097325 A1 * | 7/2013 | ............. H04L 51/08 |
| WO | WO-2015032122 A1 * | 3/2015 | ............. H04L 51/08 |

OTHER PUBLICATIONS

"iCloud: Add an attachment to an email", Retrieved on: Jun. 11, 2015 Available at: https://support.apple.com/kb/PH2629?locale=en_GB.

(Continued)

*Primary Examiner* — Asher D Kells
(74) *Attorney, Agent, or Firm* — Michael Best & Friedrich LLP

(57) ABSTRACT

Technologies are described for rich visualization of embedded objects, attachments, and links within emails and similar forms of online conversations. In some examples, the embedded objects, attachments, and links may be analyzed and parsed to generate teasers, which may include enhanced images, summary information, and comparable features. The teasers may be presented within a body of an email or in a dedicated area of a conversation user interface and include interactive features such as presentation of detailed information upon selection without opening and processing individual emails.

16 Claims, 9 Drawing Sheets

(56) References Cited

U.S. PATENT DOCUMENTS

| | | |
|---|---|---|
| 2006/0069990 A1 | 3/2006 | Yozell-Epstein et al. |
| 2007/0011258 A1* | 1/2007 | Khoo ................... G06F 3/0482 709/206 |
| 2007/0233791 A1* | 10/2007 | Sylthe .................. G06Q 10/107 709/206 |
| 2010/0095224 A1* | 4/2010 | Yozell-Epstein .... G06Q 10/107 715/752 |
| 2010/0151888 A1 | 6/2010 | Baek |
| 2010/0260426 A1* | 10/2010 | Huang .............. G06F 17/30247 382/218 |
| 2011/0131241 A1* | 6/2011 | Petrou .............. G06F 17/30861 707/770 |
| 2012/0084644 A1* | 4/2012 | Robert .................... G06F 9/451 715/255 |
| 2012/0117468 A1* | 5/2012 | Ragan ................. G06F 3/04817 715/273 |
| 2012/0124143 A1* | 5/2012 | Chung ................. G06Q 10/107 709/206 |
| 2012/0124147 A1 | 5/2012 | Hamlin et al. |
| 2012/0151379 A1* | 6/2012 | Schultz ................. G06Q 10/10 715/752 |
| 2012/0166973 A1* | 6/2012 | Gurevich .......... G06F 17/30864 715/760 |
| 2012/0215864 A1* | 8/2012 | Fukuoka ................ G06Q 10/10 709/206 |
| 2013/0151936 A1* | 6/2013 | Hsu ................... G06F 17/30864 715/205 |
| 2013/0166660 A1 | 6/2013 | Chung et al. |
| 2013/0318448 A1 | 11/2013 | O'Shaugnessy et al. |
| 2013/0332850 A1 | 12/2013 | Bovet et al. |
| 2014/0082494 A1 | 3/2014 | Harari et al. |
| 2014/0173457 A1 | 6/2014 | Wang et al. |
| 2015/0154156 A1* | 6/2015 | Meyers, Jr. ......... G06F 17/2235 715/205 |
| 2015/0186366 A1 | 7/2015 | Yan et al. |
| 2015/0200885 A1* | 7/2015 | Sharp ...................... H04L 51/08 709/206 |
| 2015/0248429 A1* | 9/2015 | Pregueiro ............. G06F 17/212 715/202 |
| 2015/0347368 A1* | 12/2015 | Carlen .................. G06F 17/241 715/230 |
| 2015/0350133 A1* | 12/2015 | Murphy .................. H04L 67/42 709/203 |
| 2016/0099896 A1* | 4/2016 | Huang .................. H04L 63/083 709/206 |
| 2016/0219004 A1* | 7/2016 | Erez ...................... G06Q 10/10 |
| 2016/0241499 A1* | 8/2016 | Hailpern ............. G06Q 10/107 |
| 2016/0315889 A1* | 10/2016 | Uraizee .................. H04L 51/08 |
| 2016/0323217 A1* | 11/2016 | Subramani ............. H04L 51/08 |
| 2017/0097808 A1* | 4/2017 | Masterson ................ G06F 7/08 |

OTHER PUBLICATIONS

"Preview attachments", Retrieved on: Jun. 11, 2015 Available at: https://support.office.com/en-us/article/Preview-attachments-5c31d9eb-e13b-4018-a5dd-344e7da3ef05.

Perez, Sarah, "Gmail Users no Longer Need to Download Attachments, As Google Drive Gets Baked Into the Inbox", Published on: Nov. 12, 2013 Available at: http://techcrunch.com/2013/11/12/gmail-users-no-longer-need-to-download-attachments-as-google-drive-gets-baked-into-the-inbox/.

"International Search Report and Written Opinion Issued in PCT Application No. PCT/US2016/047670", dated Oct. 21, 2016, 11 Pages.

* cited by examiner

INTERACTIVE PREVIEW TEASERS IN COMMUNICATIONS

BACKGROUND

Communication applications provide the ability to exchange information over a multitude of modes. Email exchange, video conferences, audio calls, text or video messaging, desktop sharing, application sharing are some examples. In addition to providing the ability for instantaneous communication, such applications also enable users to maintain records of these conversations through an email chain, online conference recording, etc.

In addition to enabling exchange of messages, emails provide a set of rich capabilities for exchange of information through embedded objects such as images and documents, attachments, and links to webpages or other documents. When a conversation is looked at as more than a set of emails, but as a record of collaboration, presentation of embedded objects, attachments, and links as such within the body of emails falls short of presenting information in a user-friendly manner.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to rich visualization of embedded objects, attachments, and links within emails and comparable communications through teasers. In some examples, one or more of an attachment, an embedded object, and a link may be detected within an email message and analyzed to determine teaser components. A teaser may be constructed from the teaser components and the email message may be presented with the teaser, where the teaser includes interactive features.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
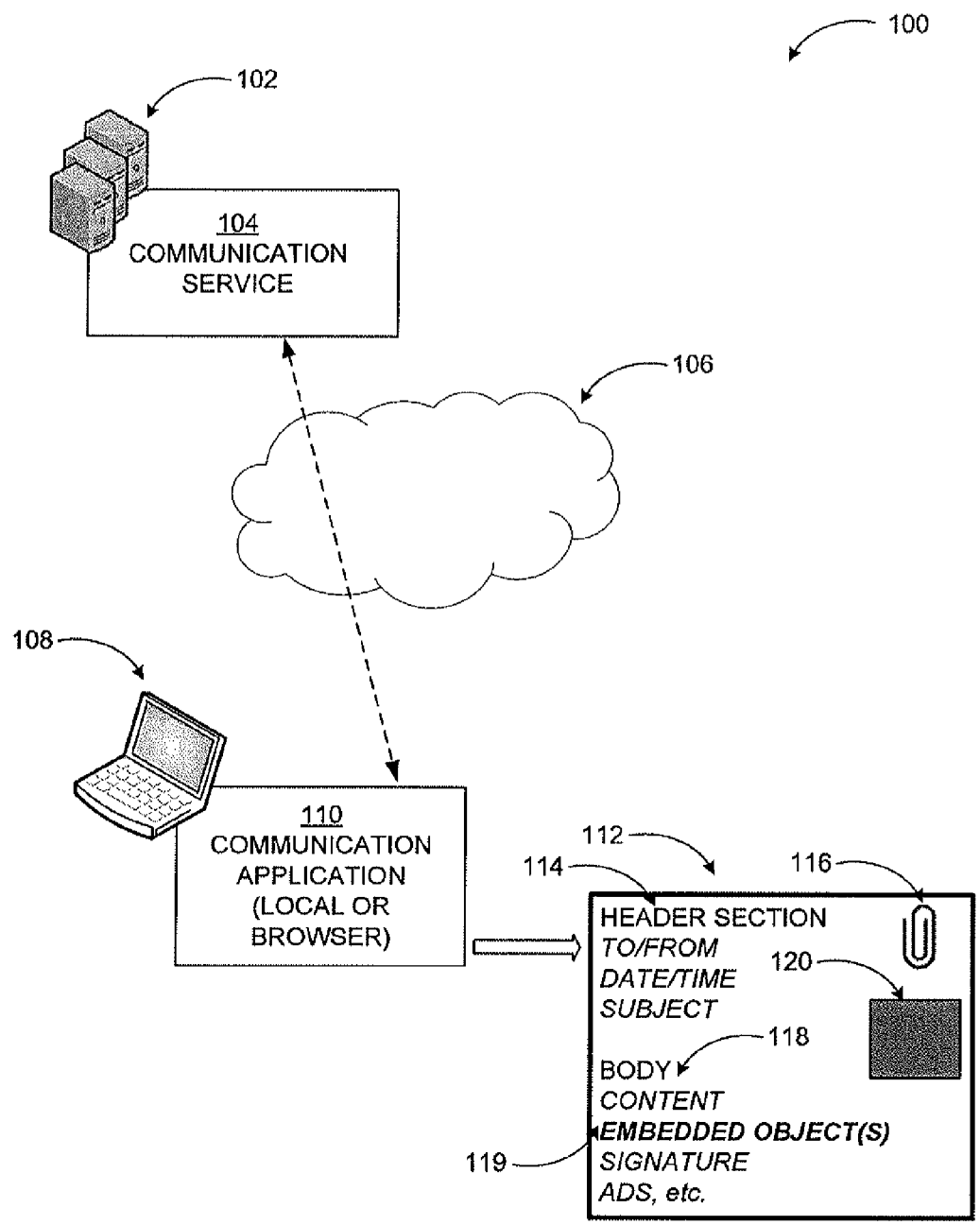
FIG. 1 includes an example system, where rich visualization of embedded objects, attachments, and links may be provided within emails.
Figure 2A:
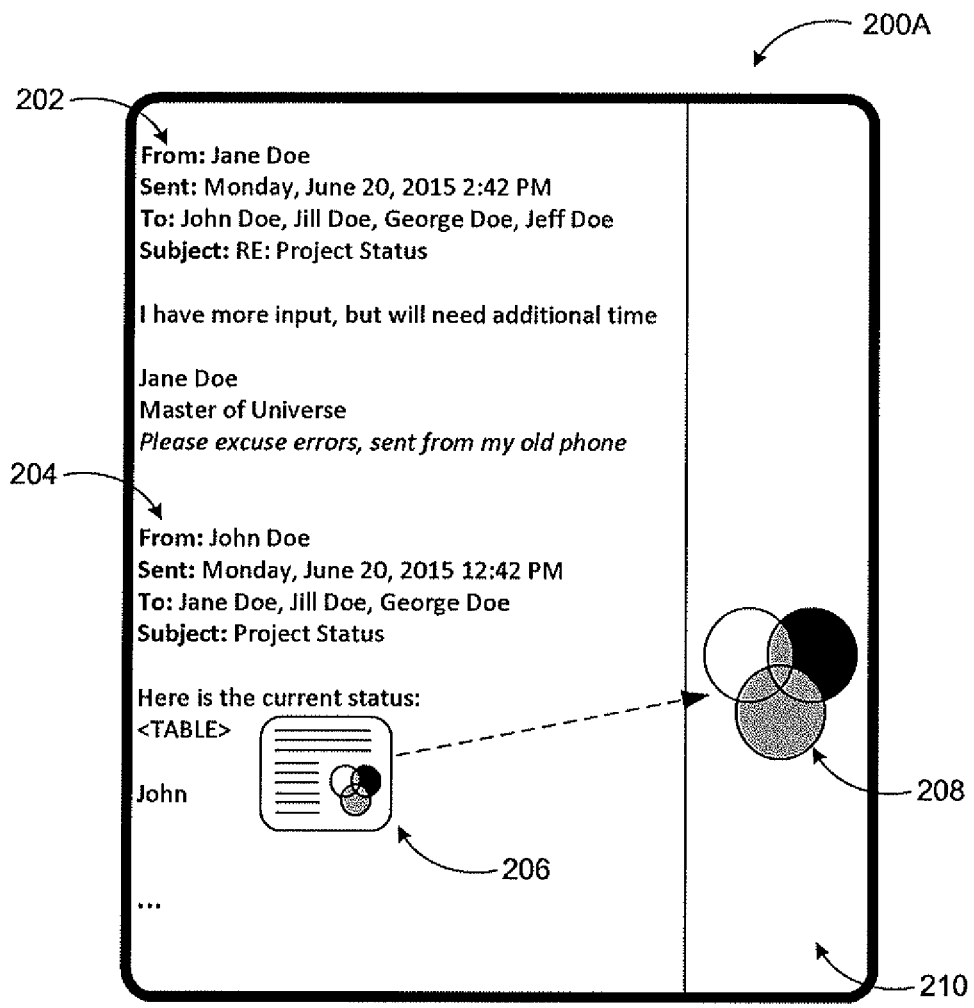
FIG. 2A through 2D illustrate various examples of teasers generated from embedded objects, attachments, and links, and different presentations of teasers.
Figure 2B:
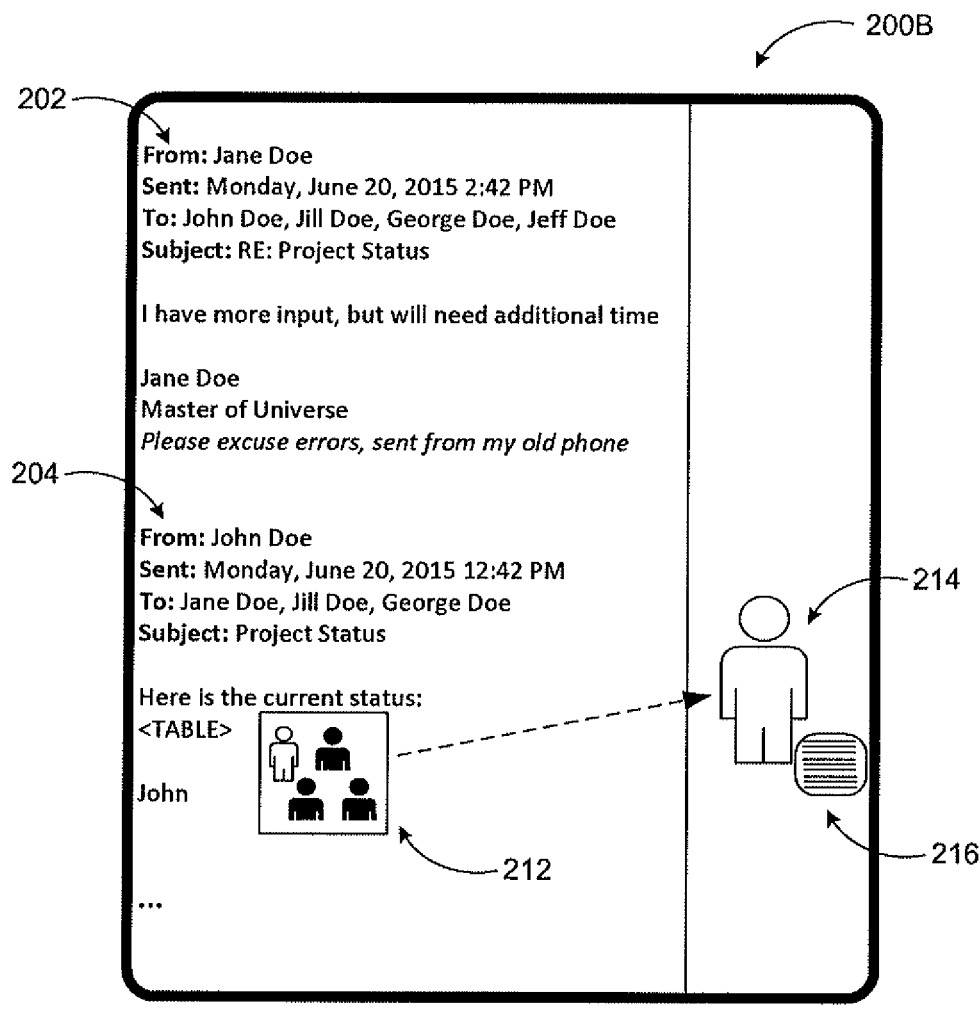
Figure 2C:
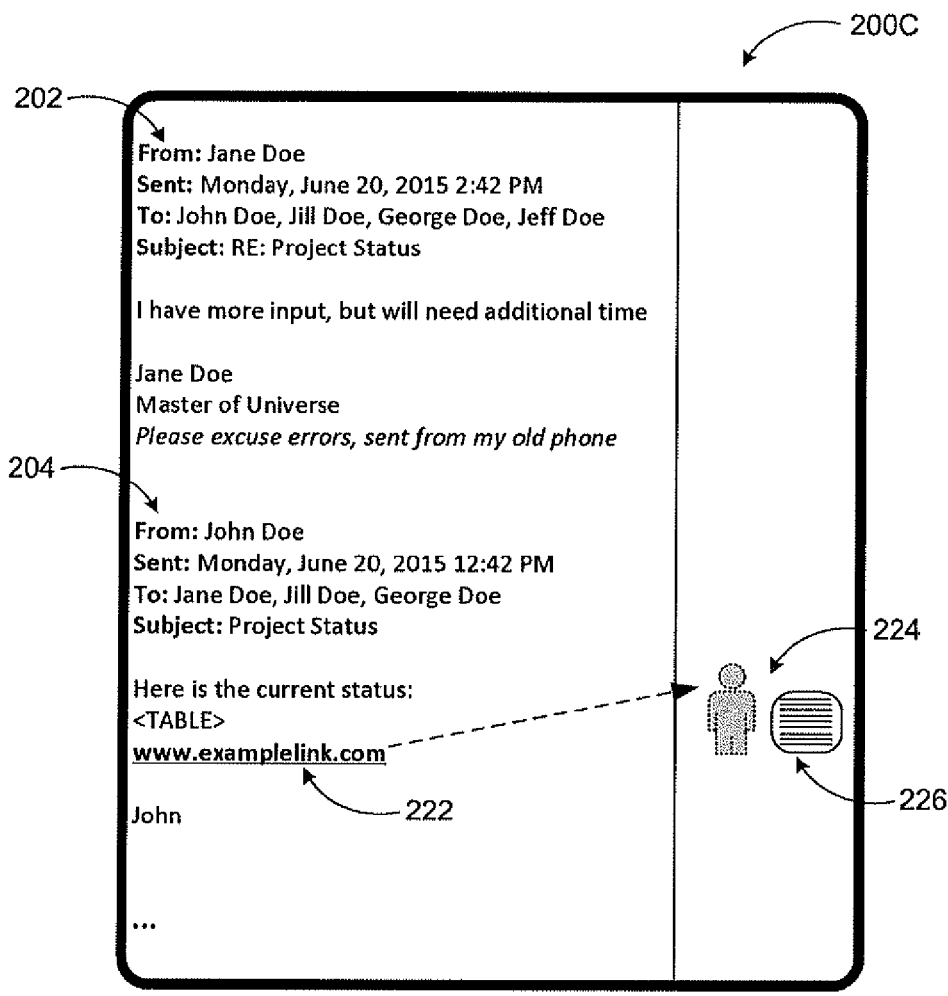
Figure 2D:
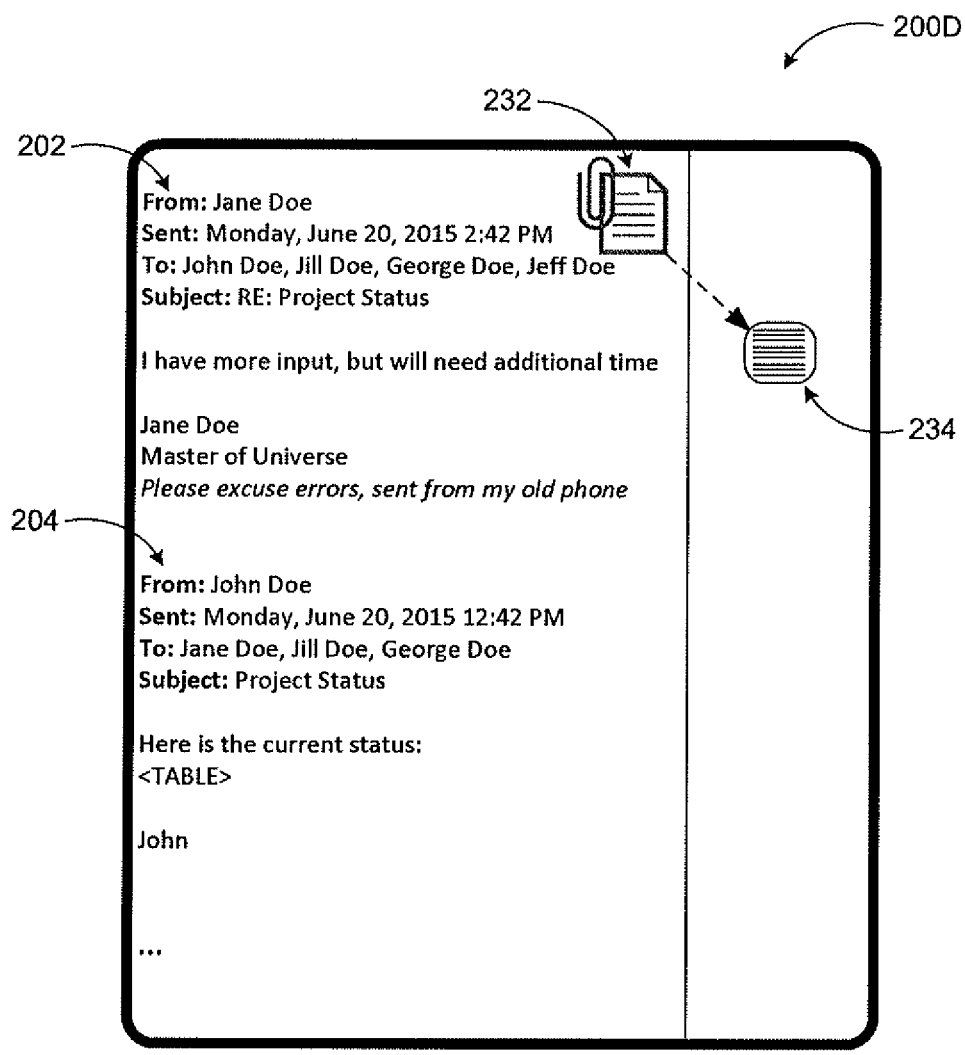

As briefly described above, rich visualization of embedded objects, attachments, and links within emails and similar forms of online conversations may be provided through teasers. The embedded objects, attachments, and links may be analyzed and parsed to generate teasers, which may include enhanced images, summary information, and comparable features. The teasers may be presented within a body of an email or in a dedicated area of a conversation user interface and include interactive features such as presentation of detailed information upon selection without opening and processing individual emails.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide rich visualization of embedded objects, attachments, and links within emails and similar forms of online conversations. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Example embodiments are described herein using emails and email conversations. Embodiments are not limited to email conversations, however. Other forms of conversations, where records are maintained in chronological order such as online conference recordings, desktop sharing sessions, text or video messaging sessions, and similar ones may also be modified through teasers for enhanced user experience using the principles discussed herein.

FIG. 1 includes an example system, where rich visualization of embedded objects, attachments, and links may be provided within emails.

As shown in diagram 100, a communication application 110 may be a local application executed on a computing device 108 and facilitate multi-modal communications with other communication applications in a distributed manner over one or more networks such as network 106. In other embodiments, a communication service 104 executed on one or more servers 102 may manage the communications and users may access the service through client applications such as communication application 110. In yet other embodiments, the communication service 104 may be accessed through thin clients, i.e., browsers. The device 102 may include a desktop computer, a laptop computer, a tablet computer, a vehicle mount computer, a smart phone, or a wearable computing device, among other similar devices.

The multi-modal communications may include email exchange, video conferences, audio calls, text or video messaging, desktop sharing, application sharing, and comparable modes. In some modes or combinations of communications modes, the communication may span over a period of time (hours, days, weeks) and involve multiple people. Such communications may be managed and maintained as a conversation. The conversation record may include a flow of communications (content), participants, timings, and other properties associated with the individual communication sessions within the conversation. The conversation (and/or) individual communications within the conversation may also include attachments, embedded objects, and links. The attachment or the embedded objects may include an image, a graphic file, a document, an audio object, and/or a video object. The links may provide a location for a webpage, a document, an online resource, and/or one or more files.

For example, an email conversation 112 may be presented as a connected series of emails with the individual messages on top of each other in the chronological order. Each message may include a header section 114 that includes a sender and recipient(s), date and time of the message, and a subject of the message. Each message may also include a body section 118 that includes the content of the message, an optional signature block, and optionally advertisements, inspirational messages, etc. One or more messages within the conversation 112 may include an attachment 116 or embedded objects 119. In a system according to embodiments, rich visualization of the embedded objects, attachments, or links may be presented through one or more teasers such as teaser 120.

FIG. 2A through 2D illustrate various examples of teasers generated from embedded objects, attachments, and links, and different presentations of teasers.

Example email conversation presentation 200A is shown with two example messages 202 and 204. Message 204 includes an embedded object 206, which may include textual and graphical content. An email application or service presenting the conversation may analyze the embedded object 206, parse the textual and graphical content, and determine that the graphical content provides a good representation of the embedded object. Various inference, analysis, and machine learning techniques may be employed to make the determination.

Once the graphical content is selected as a teaser component, a teaser 208 may be constructed from that component by, for example, changing its dimensions, modifying its presentation (e.g., colors, shading, etc.), and optionally adding interactive features. For example, one interactive feature of the teaser 208 may be display of the entire content of the embedded object 206 upon selection of the teaser 208. Another interactive feature may be presentation of additional information (e.g., retrieved from an online search about the object) associated with the embedded object 206. Yet another feature may be enlarged presentation of the teaser 208. The teaser 208 may be displayed in a dedicated portion 210 of the conversation user interface.

In example conversation presentation 200B, the message 204 includes an embedded image 212 instead of a mixed content embedded object. The image 212 may include multiple people in it. A teaser module of the email application or service may perform facial recognition analysis on the image 212 and select one of the people as a teaser component, retrieve information associated with a recognized person, and generate the teaser using the image of the recognized person 214 and the retrieved information 216. The selection of the person may be based on a number of factors such as text surrounding the image or retrieved from an online search, an association of the recognized person with the sender or recipients of the email, a context of the conversation, and other factors. Various inference, analysis, and machine learning techniques may be employed to perform the facial recognition analysis and select a person (or persons) as teaser component.

In other embodiments, a salient region analysis may be performed on an embedded image or attached image file and the salient region selected as teaser component. The teaser may then be generated using the salient region of the image and other information obtained during the analysis.

In example conversation presentation 200C, the message 204 includes a link 222 instead of an embedded object or image. The link 222 may refer to a webpage. In other embodiments, the link 22 may also refer to a location for a document, an online resource, and one or more files. Upon detecting the link 222 and analyzing it, the teaser module may generate a teaser based on the gathered information. For example, representative image 224 and summary text 226 associated with the webpage may be presented as the teaser. If the link refers to one or more files or documents, they may be analyzed and the teaser generated similarly. If the link refers to an online resource such as a printer, scanner, or similar resource, a graphical representation and information associated with the resource may be presented as the teaser (for example, what type of printer and how many documents are in queue).

In example conversation 200D, the message 202 may include an attached document 232. As in the other examples, a teaser module may analyze the attachment, its content, metadata, and other properties, and generate a teaser that may, for example, be a summary 234 associated with the attached document 232.

While the example teasers in FIG. 2A through 2D are shown in dedicated areas of the example conversations, teasers may be presented in a number of ways. For example, teasers may be displayed within a body of a corresponding email (e.g., near the embedded object or other suitable location), in a pop-up style user interface, and other locations.

Figure 3:
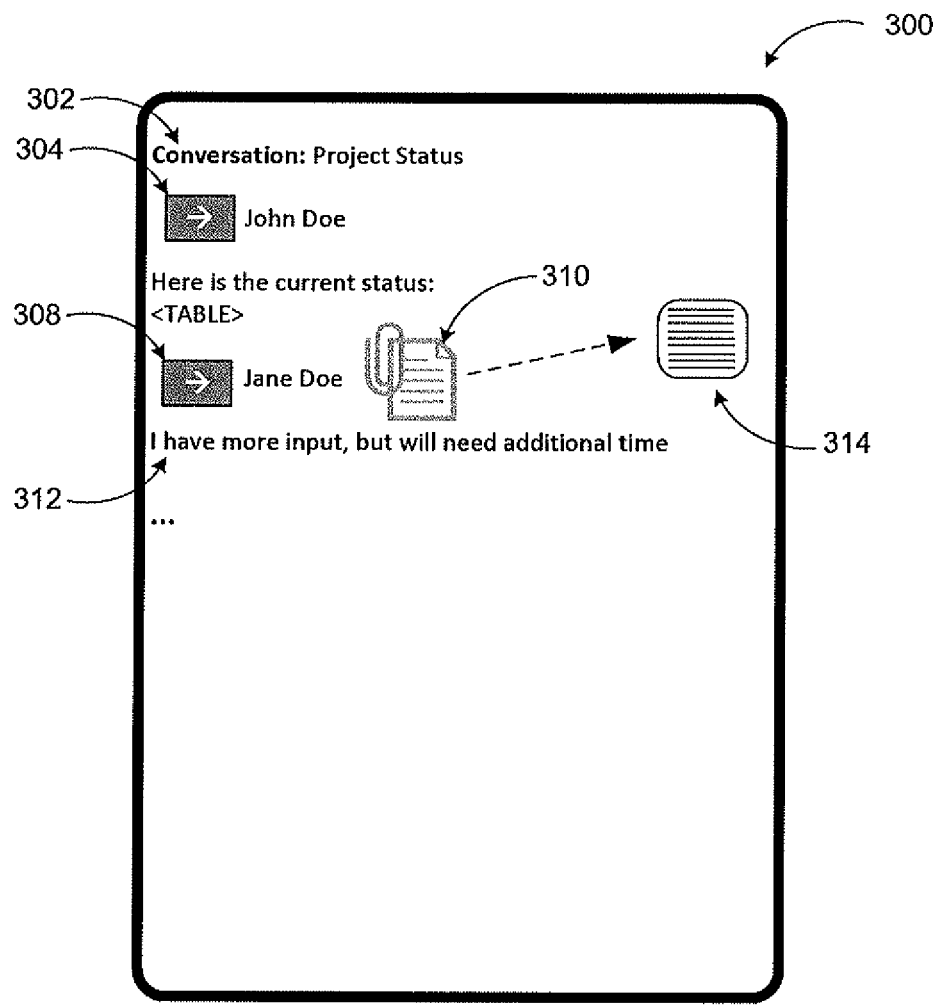
FIG. 3 illustrates another presentation of a teaser within a conversation.

FIG. 3 illustrates another presentation of a teaser within a conversation.

Conversation presentation 300 is an example of enhanced conversation display, where content that may distract a user is removed or hidden, and other elements are introduced to provide a focused, user-friendly display of the conversation content. For example, a conversation identifier 302 provides the context of the conversation. Control elements 304 and 308 may enable users to toggle between full view and optimized view, which include relevant content 312 of each message, and not headers, signatures, advertisements, etc.

In the example collapsed state of the messages, an attachment 310 may be displayed with de-emphasis (e.g., greyed or dashed). A teaser 314 generated from the attachment 310 may be presented more prominently giving users an enhanced context of the conversation. The teaser 314 may include further interactive features, which upon activation may cause additional detail information to be displayed, for example. In some embodiments, graphical, highlighting, textual, color, and/or shading schemes may be employed to present the teaser and an association between the teaser and the attachment.

As discussed above, a communication application or service providing conversation rich visualization of embedded objects, attachments, and links within emails and comparable communications through teasers may enable reduced processor load (and consequently increased processing speed), conservation of memory, and reduced network bandwidth usage, among other features, that may improve the efficiency and performance of computing devices associated with the facilitated communications. For example, as a result of obtaining summarized information, users may reduce a number of repeated messages or opening and processing of individual messages in order to review embedded objects, attachments, or links. User interaction may also be optimized.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of users and applications.

The examples provided in FIGS. 1 through 3 are illustrated with specific services, applications, communication modes, modules, module components, and configurations. Embodiments are not limited to environments according to these examples. Rich visualization of embedded objects, attachments, and links within emails and comparable communications through teasers may be implemented in environments employing fewer or additional services, applications, communication modes, modules, module components, and user experience configurations. Furthermore, the example services, applications, communication modes, modules, module components, and configurations shown in FIG. 1 through 3 may be implemented in a similar manner with other values using the principles described herein.

Figure 4:
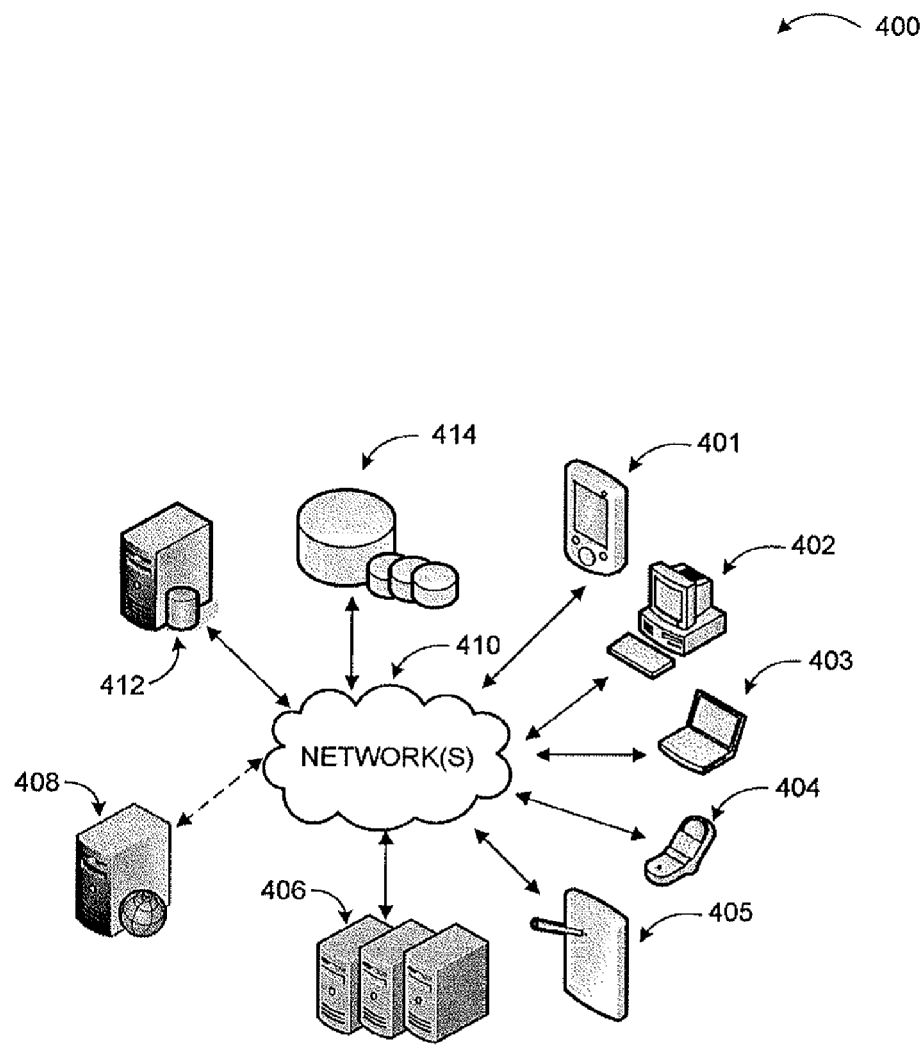
FIG. 4 is a networked environment, where a system according to embodiments may be implemented.

FIG. 4 is a networked environment, where a system according to embodiments may be implemented. In addition to locally installed applications, such as application 522 discussed below, rich visualization of embedded objects, attachments, and links within emails and comparable communications through teasers may also be implemented in conjunction with hosted communication applications and services that may be implemented via software executed over one or more servers 406 or individual server 408. A hosted service or application may communicate with client applications on individual computing devices such as a handheld computer 401, a desktop computer 402, a laptop computer 403, a smart phone 404, a tablet computer (or slate), 405 ('client devices') through network(s) 410 and control a user interface presented to users.

Client devices 401-405 are used to access the functionality provided by the hosted service or application. One or more of the servers 406 or server 408 may be used to provide a variety of services as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide rich visualization of embedded objects, attachments, and links within emails and comparable communications through teasers. Furthermore, the networked environments discussed in FIG. 4 are for illustration purposes only. Embodiments are not limited to the example applications, modules, or processes.

Figure 5:
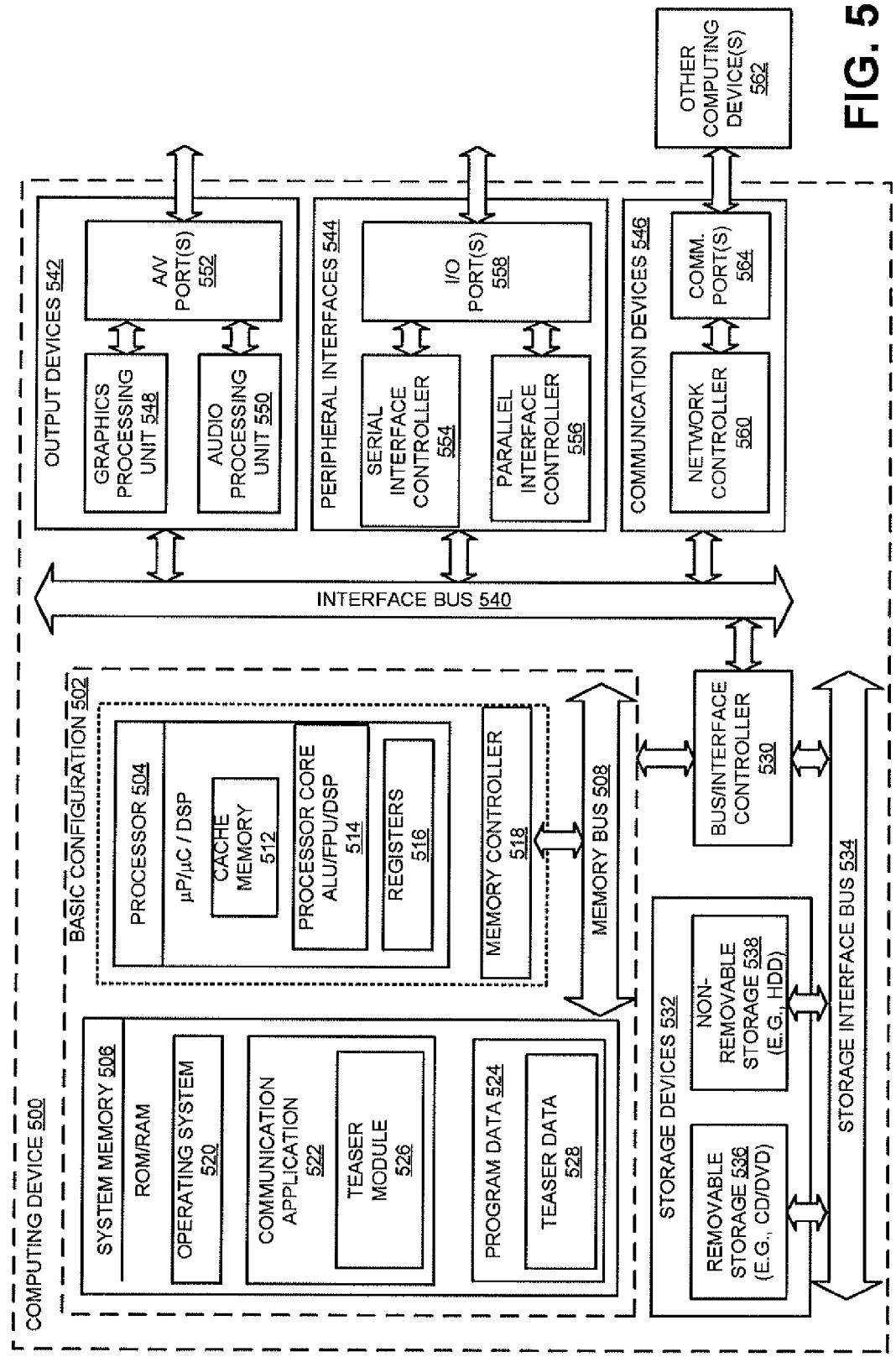
FIG. 5 is a block diagram of an example general purpose computing device, which may be used to provide rich visualization of embedded objects, attachments, and links.

FIG. 5 is a block diagram of an example general purpose computing device, which may be used to provide rich visualization of embedded objects, attachments, and links.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication application 522, and program data 524. The communication application 522 may include a teaser module 526, which may be an integrated module of the communication application 522. The teaser module 526 may be configured to analyze embedded objects, attachments, and links within emails and similar forms of online conversations, generate teaser components, and construct teasers to be presented along with the communications, as described herein. The program data 524 may include, among other data, teaser data 528, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide rich visualization of embedded objects, attachments, and links within emails and similar forms of online conversations. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
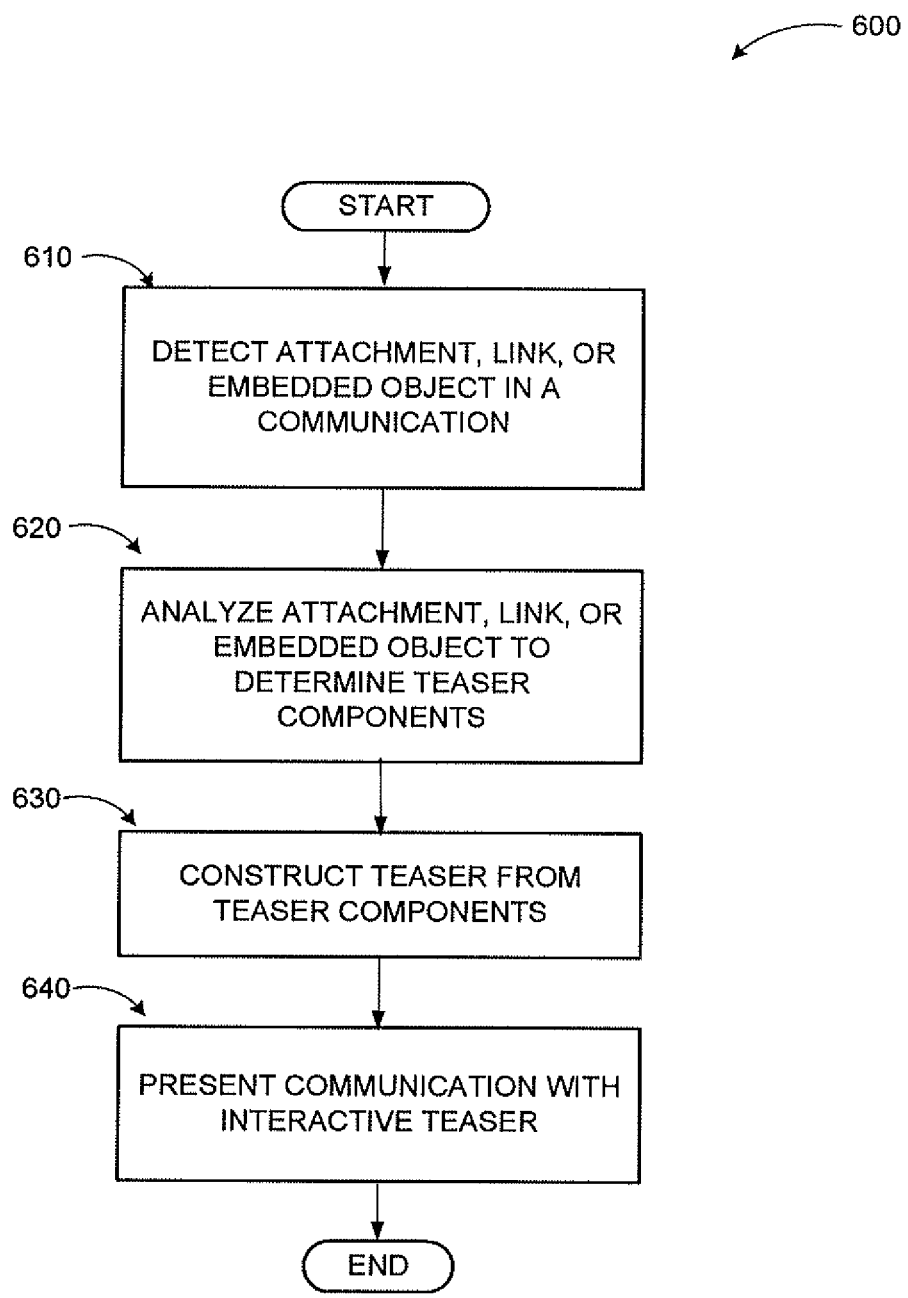
FIG. 6 illustrates a logic flow diagram of a method to provide rich visualization of embedded objects, attachments, and links within emails, according to embodiments.

FIG. 6 illustrates a logic flow diagram of a method to provide rich visualization of embedded objects, attachments, and links within emails, according to embodiments.

Process 600 may be implemented on a computing device, server, or other system. An example system may include a communication application installed on a device, where a teaser module is integrated with the application. The teaser module may include specialized components, such as a data collection and analysis engine, among other components.

Process 600 begins with operation 610, where the teaser module may detect one or more attachments, embedded objects, and links within the individual communications. Attachments or embedded objects may include images, graphics, audio/video objects, textual documents, and similar data. Links may refer to webpages or locations of other documents.

At operation 620, the teaser module may analyze the detected attachments, embedded objects, and/or links to determine teaser components. Teaser components may include images, graphics, textual information generated from the detected elements. As described herein, images may be processed and salient portions may be extracted, facial recognition may be employed and information associated with the people in an image may be retrieved, textual or graphical summaries or abstracts of documents may be generated, summaries of video or audio objects may be generated, etc.

At operation 630, one or more teasers may be constructed from the teaser components. The teasers may include combinations of various teaser components. For example, a teaser for an attached document may include a textual summary of the document's content and one or more images from the document's content that may be of interest to a user. The teasers may also include interactive features such as presentation of additional information if the teaser or part of it is selected, activation of links, and other features.

At operation 640, the communication may be presented by the communication application with the teasers.

The operations included in process 600 are for illustration purposes. Rich visualization of embedded objects, attachments, and links within emails and similar forms of online conversations may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a method means for providing rich visualization of embedded objects, attachments, and links within emails through teasers is described. An example means may include means for detecting one or more of an attachment, an embedded object, and a link within an email message; means for analyzing the one or more of the attachment, the embedded object, and the link to determine teaser components; means for constructing a teaser from the teaser components; and means for presenting the email message with the teaser, where the teaser includes interactive features.

According to some examples, a computing device to provide rich visualization of embedded objects, attachments, and links within emails through teasers is described. An example computing device may include a memory configured to store instructions and one or more processors coupled to the memory, the one or more processors configured to execute, in conjunction with the instructions stored in the memory, a communication application and a teaser module integrated with the communication application. The teaser module may be configured to detect one or more of an attachment, an embedded object, and a link within an email message; analyze the one or more of the attachment, the embedded object, and the link to determine teaser components; and construct a teaser from the teaser components, wherein the teaser includes interactive features. The communication application may be configured to present the email message with the teaser, wherein the teaser is presented in one of a body of the email message and a dedicated portion of a conversation user interface.

According to other examples, the teaser module may be configured to analyze the one or more of the attachment, the embedded object, and the link by parsing one or more of a content, one or more properties, and metadata associated with the one or more of the attachment, the embedded object, and the link. The teaser module may be further configured to analyze the one or more of the attachment, the embedded object, and the link by retrieving online information associated with the one or more of the attachment, the embedded object, and the link. The teaser module may be configured to construct the teaser from the teaser components by performing facial recognition analysis on an image teaser component, retrieving information associated with a recognized person, and generating the teaser using the image of the recognized person and the retrieved information.

According to further examples, the teaser module may be configured to construct the teaser from the teaser components by performing salient region analysis on an image teaser component and generating the teaser using a salient region of the image. The teaser module may be configured to construct the teaser from the teaser components by analyzing textual and graphical content of a document or a website and generating the teaser using a summary of the textual content and one or more representative graphical objects.

According to yet other examples, the interactive features may include one or more of presentation of additional information if the teaser or a portion of the teaser is selected, activation a corresponding link, and activation of an application associated with the one or more of the attachment, the embedded object, and the link. The teaser module may be configured to present additional information, activate the corresponding link, or activate the application associated with the one or more of the attachment, the embedded object, and the link without opening the email message in a separate user interface. The attachment may include an image, a graphic file, a document, an audio object, or a video object. The embedded object may include an image, a graphic file, a document, an audio object, or a video object. The link may provide a location for one of a webpage, a document, an online resource, or one or more files.

According to other examples, a method executed at least in part in a computing device to provide rich visualization of embedded objects, attachments, and links within emails through teasers is described. An example method may include detecting one or more of an attachment, an embedded object, and a link within an email message; analyzing the one or more of the attachment, the embedded object, and the link to determine teaser components; constructing a teaser from the teaser components; and presenting the email message with the teaser, where the teaser includes interactive features.

According to some examples, analyzing the one or more of the attachment, the embedded object, and the link to determine teaser components may include one or more of parsing one or more of a content, one or more properties, and metadata associated with the one or more of the attachment, the embedded object, and the link; and retrieving online information associated with the one or more of the attachment, the embedded object, and the link. Constructing a teaser from the teaser components may include one or more of performing facial recognition analysis on an image teaser component, retrieving information associated with a recognized person, and generating the teaser using the image of the recognized person and the retrieved information; performing salient region analysis on an image teaser component and generating the teaser using a salient region of the image; and analyzing textual and graphical content of a document or a website and generating the teaser using a summary of the textual content and one or more representative graphical objects.

According to yet other examples, the attachment and the embedded object may include an image, a graphic file, a document, an audio object, or a video object, and the link may provide a location for one of a webpage, a document, an online resource, or one or more files. The method may also include presenting the interactive features to enable temporary or persistent display of detailed information associated with the teaser. The method may further include employing one or more of a graphical scheme, a highlighting scheme, a textual scheme, a color scheme, and a shading scheme to present the teaser and an association between the teaser and the one or more of the attachment, the embedded object, and the link within the email message.

According to further examples, a computer readable memory device with instructions stored thereon to provide rich visualization of embedded objects, attachments, and links within communications through teasers is described. The instructions may include detecting one or more of an attachment, an embedded object, and a link within one or more communications in a conversation; analyzing the one or more of the attachment, the embedded object, and the link to determine teaser components; constructing a teaser from the teaser components, wherein the teaser includes interactive features; and presenting the conversation with the teaser.

According to some examples, the teaser may be presented in one of a body of a corresponding communication and a dedicated portion of a conversation user interface. The one or more communications may include one or more of email messages, text messages, video messages, online conference recordings, desktop sharing sessions, and application sharing sessions.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide rich visualization of embedded objects, attachments, and links within emails through teasers, the computing device comprising:
   a memory configured to store instructions; and
   one or more processors coupled to the memory, the one or more processors configured to execute, in conjunction with the instructions stored in the memory, a communication application, wherein the one or more processors are configured to:
      provide a conversation to be displayed on a conversation user interface, the conversation comprising a plurality of email messages;
      detect an embedded object within an email message of the plurality of email messages;
      analyze the embedded object to determine one or more teaser components, each of the one or more teaser components including a portion of textual or graphical content included in the embedded object;
      conducting a search of an external source for additional information associated with the embedded object based on content included in at least one of the one or more teaser components;
      construct a teaser including at least one of the one or more teaser components and the additional information; and
      provide the teaser to be displayed within a body of the email message or on a dedicated portion of the conversation user interface without requiring a user to open the email message in a separate user interface.

2. The computing device of claim 1, wherein the one or more processors are further configured to analyze the embedded object by parsing one or more of a content, one or more properties, and metadata associated with the embedded object.

3. The computing device of claim 1, wherein the one or more processors are further configured to perform facial recognition analysis on an image teaser component included in the one or more teaser components and wherein the one or more processors are further configured to conduct the search of the external source for the additional information by conducting a search for information associated with a recognized person.

4. The computing device of claim 1, wherein one or more processors are further configured to construct the teaser from the one or more teaser components by performing salient region analysis on an image teaser component included in the one or more teaser components.

5. The computing device of claim 1, wherein the one or more processors are further configured to construct the teaser from the one or more teaser components by analyzing textual and graphical content of a document or a web site and generating a summary of the textual content and one or more representative graphical objects.

6. The computing device of claim 1, wherein the teaser includes interactive features, and wherein the interactive features include one or more of presentation of additional information if the teaser or a portion of the teaser is selected, activation a corresponding link, and activation of an application associated with the embedded object.

7. The computing device of claim 1, wherein the one or more processors are further configured to:
   detect an attachment within the email message;
   analyze the attachment to determine the teaser components, the teaser components further including textual and graphical content portions associated with the attachment; and
   construct another teaser using the determined teaser components, wherein the other teaser is configured to present detailed information associated with the attachment, wherein the attachment includes one of an image, a graphic file, a document, an audio object, and a video object.

8. The computing device of claim 1, wherein the embedded object includes one of an image, a graphic file, a document, an audio object, and a video object.

9. The computing device of claim 1, wherein the one or more processors are further configured to:
   detect a link within the email message;
   analyze the link to determine the teaser components, the teaser components further including textual and graphical content portions associated with the link; and
   construct a further teaser using the determined teaser components, wherein the further teaser is configured to present detailed information associated with the link, wherein the link provides a location for one of a webpage, a document, an online resource, and one or more files.

10. A method executed at least in part in a computing device to provide rich visualization of embedded objects, attachments, and links within emails through teasers, the method comprising:
   providing a conversation to be displayed on a conversation user interface, the conversation comprising a plurality of email messages;
   detecting an embedded object within an email message of the plurality of email messages;
   analyzing the embedded object to determine one or more teaser components, each of the one or more teaser components including a portion of textual or graphical content included in the embedded object;
   conducting a search of an external source for additional information associated with the embedded object based on content included in at least one of the one or more teaser components;

constructing a teaser including at least one of the one or more teaser components and the additional information;

providing the email message to be displayed with the teaser; and providing, to be displayed on the conversation user interface, detailed information associated with the embedded object upon selection of the teaser without requiring a user to open the email message in a separate user interface.

11. The method of claim 10, wherein analyzing the embedded object to determine the one or more teaser components comprises parsing one or more of a content, one or more properties, and metadata associated with the embedded object.

12. The method of claim 10, further comprising one or more of:

performing facial recognition analysis on an image teaser component included in the one or more teaser components and wherein conducting the search of the external source for the additional information includes retrieving information associated with a recognized person, and wherein the teaser includes the image of the recognized person and the retrieved information;

performing salient region analysis on an image teaser component and wherein the teaser includes a salient region of the image; and analyzing textual and graphical content of a document or a web site and wherein the teaser includes a summary of the textual content and one or more representative graphical objects.

13. The method of claim 10, wherein the embedded object includes one of an image, a graphic file, a document, an audio object, and a video object.

14. The method of claim 10, further comprising:

employing one or more of a graphical scheme, a highlighting scheme, a textual scheme, a color scheme, and a shading scheme to present the teaser and an association between the teaser and the embedded object.

15. A hardware computer readable memory device with instructions stored thereon to provide rich visualization of embedded objects, attachments, and links within communications through teasers, the instructions comprising:

providing a conversation to be displayed on a conversation user interface, the conversation comprising a plurality of communications;

detecting an embedded object within one or more communication in the conversation;

analyzing the embedded object to determine one or more teaser components, each of the one or more teaser components including a portion of textual or graphical content included in the embedded object;

conducting a search of an external source for additional information associated with the embedded object based on content included in at least one of the one or more teaser components;

constructing a teaser including at least one of the one or more teaser components and the additional information, wherein the teaser is configured to present detailed information associated with the embedded object upon selection without requiring a user to open the communication in a separate user interface; and providing the conversation to be displayed with the teaser displayed within a body of the communication or on a dedicated portion of the conversation user interface.

16. The hardware computer readable memory device of claim 15, wherein the communication includes one or more of an email message, a text message, a video message, an online conference recording, a desktop sharing session, and an application sharing session.

* * * * *